United States Patent
Chapman et al.

(10) Patent No.: US 7,078,883 B2
(45) Date of Patent: Jul. 18, 2006

(54) METHOD AND APPARATUS FOR STARTING POWER CONVERTERS

(75) Inventors: Patrick Chapman, Champaign, IL (US); Philip T. Krein, Champaign, IL (US); Jonathan Kimball, Mahomet, IL (US); Theresa L. Flowers, Hermosa Beach, CA (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 119 days.

(21) Appl. No.: 10/819,709

(22) Filed: Apr. 7, 2004

(65) Prior Publication Data

US 2005/0226011 A1  Oct. 13, 2005

(51) Int. Cl.
*G05F 1/652* (2006.01)

(52) U.S. Cl. ............... 323/232; 323/284; 323/901; 363/16; 363/49

(58) Field of Classification Search ........ 323/222, 323/232, 282, 284, 290, 363, 901; 363/16, 363/21.01, 97, 98, 131, 132, 49
See application file for complete search history.

(56) References Cited

U.S. PATENT DOCUMENTS 5,466,998 A * 11/1995 Kinoshita et al. ......... 318/375
6,445,167 B1 * 9/2002 Marty ..................... 323/280

OTHER PUBLICATIONS

J.M. Damaschke, "Design of a low-Input-Voltage Converter for Thermoelectric Generation," *IEEE Transactions on Industry Applications*, vol. 33, No. 5, pp. 1203-1207, 1997, no month.

M. Shepard, R.C. Williamson, "Very Low Voltage Power Conversion," *2001 IEEE International Symposium on Circuits and Systems*, 2001, pp. 289-292, no month.

"Low Voltage, High Currents, A New Concept in Voltage Converters," http://www.ise.fraunhofer.de/english/press/index/html, no date.

http://wire0.ises.org/wire/Publicatoins/PressKit/nsf/396e92819880db7dc125680f00443688/7FA2C015D7EE7631C1256706005D5FF6/$File/dcdc_e.htm, no date.

Saidani, Meyer, and Gijs, "Hybrid MEMS Inductor for Miniaturized Autonomous Power Converter," *16th IEEE Annual Conference on Microeletromechanical Systems*, 2003, pp. 586-589, no month.

K.N. Leung, P.K.T. Mok, A sub-1-V 15-ppm CMOS bandgap voltage reference without requiring low threshold voltage device, *IEEE Journal of Solid-State Circuits*, vol. 37, No. 4, p. 526-530, Apr. 2002.

W. Qi, S. Bingxian, A design of CMOS voltage doubler for 1 V operation, *4th International Conference on ASIC*, 2001, pp. 255-258, no month.

* cited by examiner

*Primary Examiner*—Jessica Han
(74) *Attorney, Agent, or Firm*—Greer, Burns & Crain, Ltd

(57) ABSTRACT

A startup circuit for starting a power converter for converting an input voltage to an output voltage includes a switch connected in series with a resistive element. The startup circuit is connected in parallel with a trigger switch in the power converter for enabling the power converter to generate the output voltage. When closed or activated, the switch in the startup circuit charges an energy storing device in the power converter. The energy storing device activates the trigger switch as the charge is released.

31 Claims, 4 Drawing Sheets

METHOD AND APPARATUS FOR STARTING POWER CONVERTERS

FIELD OF THE INVENTION

The present invention relates to power converters, and more particularly, to a startup circuit for providing the initial startup power for activating a power converter.

BACKGROUND OF THE INVENTION

Most electronic circuits run on DC supply voltages, typically about 1 V to 5 V. To supply these circuits, many methods start with a sufficiently high voltage and use a power converter to step down or up to the desired level. Frequently, a power converter circuit would be connected to a source voltage which provides a startup power and also the operating voltage required to run the power converter control. Typically, a startup circuit is provided to supply the initial power up signal from the source voltage to get the converter running just long enough for it to become self-sustaining. Once the power converter reaches the self-sustaining stage, the startup circuit would no longer be necessary and the power converter operates directly from the source voltage.

The power source could be a low voltage single fuel cell or single photovoltaic (solar) cell, for example, which are potential components of present and future energy supply. While a single cell or similar low voltage power source may provide adequate voltage necessary to operate the power converter in the self-sustaining stage of operation, this voltage level, however, may not be sufficient to initially turn on or trigger the power converter into the operational stage.

SUMMARY OF THE INVENTION

A startup circuit for starting a power converter for converting an input voltage to an output voltage includes a switch connected in series with a resistive element. The startup circuit is connected in parallel with a trigger switch in the power converter for enabling the power converter to generate the output voltage. When closed or activated, the switch in the startup circuit charges an energy storing device in the power converter. The energy storing device activates the trigger switch as the charge is released.

DETAILED DESCRIPTION OF THE PREFERRED EMBODIMENTS

The invention concerns a startup circuit for initially starting a power converter for converting an input voltage to a higher or lower output voltage. An embodiment of the present invention is configured and adapted for use with an arbitrary startup power voltage, including very low voltages. The startup circuit in accordance with one embodiment generally includes a switch connected in series with a resistive element. The startup circuit is connected in parallel with a trigger switch of the power converter (for enabling generation of the converted output voltage) and in series with an energy storing device of the power converter.

Closing of the switch in the startup circuit causes the energy storing device to be charged by the input voltage. The energy storing device discharges when the startup circuit switch is opened, thereby activating the trigger switch of the power converter into a self-sustaining mode of converting the input voltage to a higher or lower output voltage. Since most, if not all, power converters include a trigger switch and an energy storing device such as an inductor, the startup circuit can be incorporated into many different power converter configurations.

Figure 1:
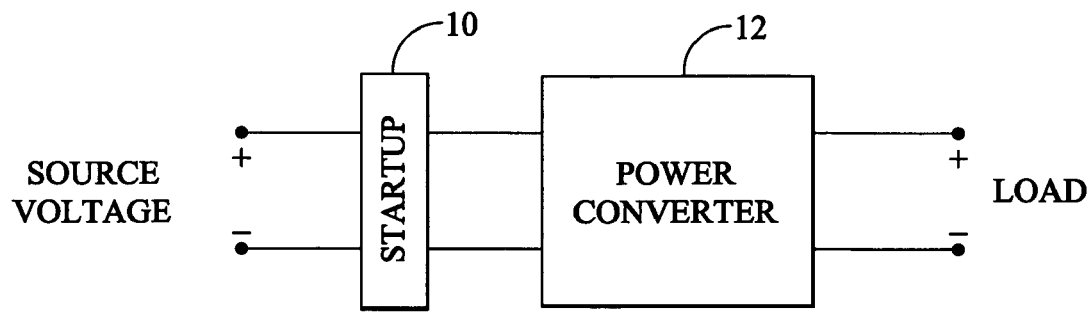
FIG. 1 is a block diagram illustrating a startup circuit connected to a power converter in accordance with an embodiment of the present invention.
Figure 2:
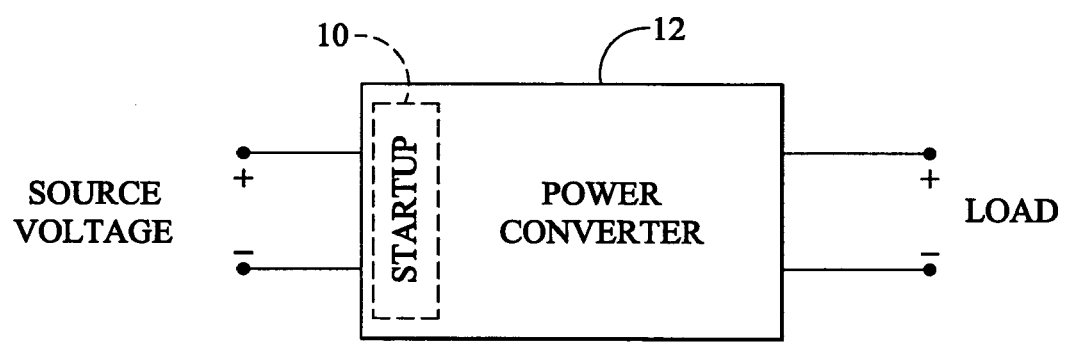
FIG. 2 a block diagram illustrating a startup circuit incorporated in a power converter in accordance with an embodiment of the present invention.

Referring now to FIG. 1, and in accordance with one embodiment of the present invention, a startup circuit 10 is operatively connected to a power converter 12. The startup circuit 10 is also connected to a voltage source for activating and operating the power converter. Once activated, the power converter 12 converts DC voltage input from the voltage source to a higher or lower DC voltage, and outputs the converted voltage to a load. While the startup circuit 10 and the power converter 12 are shown as two separate components in FIG. 1, the startup circuit can be incorporated into the power converter in accordance with another embodiment of the invention, as shown in FIG. 2.

Figure 3:
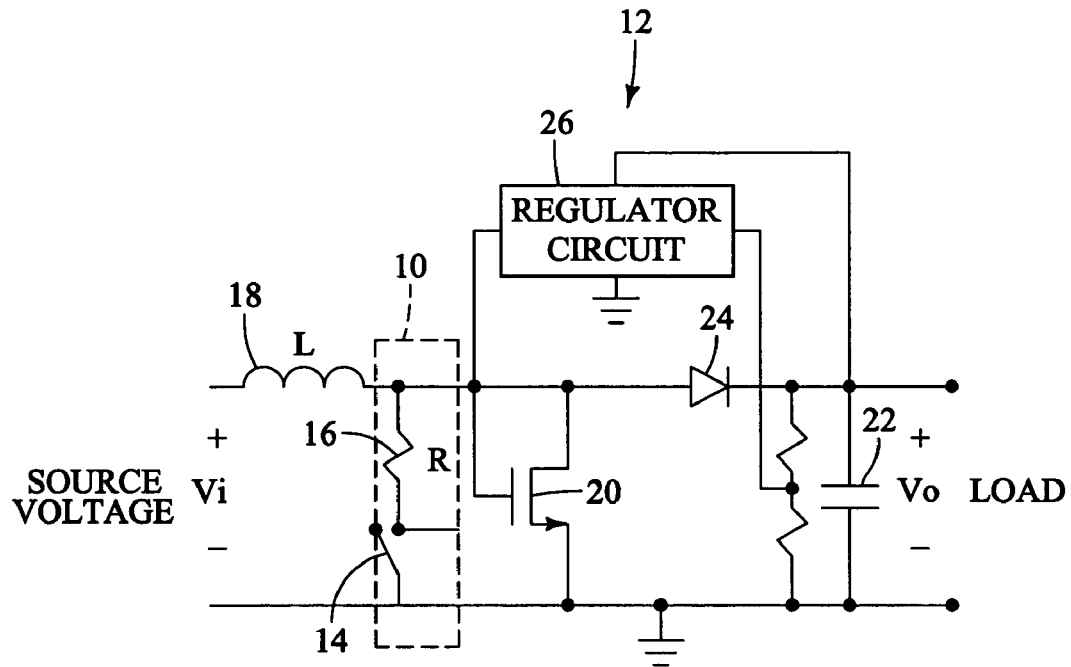
FIG. 3 is a circuit diagram of a boost power converter including a startup circuit in accordance with an embodiment of the present invention.

Turning now to FIG. 3, the startup circuit 10 in accordance with an embodiment of the invention includes a switch 14 and a resistive element 16 connected in series with the switch. The switch 14, for example, can be a mechanical momentary switch, which closes or activates while the switch is held down by a user and opens or deactivates when the switch is released. Other example embodiments use devices, mechanical or otherwise, which function similarly to the momentary switch 14. The resistive element 16 can be an ordinary resistor or a temperature controlled resistor, for example.

In FIG. 3, the startup circuit 10 is incorporated in power converter 12, which is a boost type power converter, for increasing the low voltage $V_i$ from the voltage source to a higher output voltage $V_o$ for supplying the load. The power converter 12 includes an inductor 18 connected in series between the voltage source $V_i$ and the startup circuit 10, and a semiconductor switch 20 connected in parallel with the startup circuit 10. The switch 20 shown in FIG. 3 is a MOSFET, but other types of semiconductor switches such as a diode, BJT transistor, etc., would also be suitable. A capacitor 22 connected in parallel to the switch 20 forms the output of the power converter 12 for outputting the converted output voltage $V_o$. Also included in the power converter 12 is a diode 24 connected between the switch 20 and the capacitor 22, and a feedback regulator circuit 26.

In the power converter 12 of FIG. 3, the switch 20 and the regulator circuit 26 require at least several volts to operate, but much less voltage might be available from the source voltage. In operation, the switch 14 is activated or closed by a user. In other embodiments the switch may be activated, for example, by a control circuit. Activation of the switch 14 forces the source voltage $V_i$ to charge the inductor 18, which continues to charge as long as the switch 14 is closed, but the current is ultimately limited by the resistor 16. When the switch 14 is released a moment later, the inductor current continues to flow despite the switch being open. Therefore, the current is forced through the diode 24 and onto the capacitor 22. The stored energy of the inductor 18 is almost entirely (except for small losses) forced onto the capacitor 22, which charges to the output voltage $V_o$. The capacitor 22 forms the output $V_o$ of the converter 12, and feeds the load and the regulator circuit 26.

The values of the resistor 16, the inductor 18, and the capacitor 22 determine the voltage of the capacitor, i.e., the output voltage $V_o$. Generally, the values of the inductor 18 and the capacitor 22 are selected without startup consideration to meet circuit objectives of the power converter 12, so the resistor 16 of the startup circuit 10 becomes the design variable. If chosen properly, the voltage on the capacitor 22 charges to the desired value $V_o$.

In accordance with an embodiment of the invention, the selection of the approximate value of the resistor 16 for use with the boost power converter 12 of FIG. 3 is described. Assuming the switch 14 is held on long enough (about 4 or 5 time constants, each L/R), then the energy stored in the inductor 18 reaches $$W = \frac{1}{2} L \left( \frac{V_i}{R} \right)^2 \qquad (1)$$

assuming all of this energy transfers to the capacitor 22 (neglecting the small loss of the diode and stray loss of the inductor 18 and the capacitor 22), $$\frac{1}{2} L \left( \frac{V_i}{R} \right)^2 = \frac{1}{2} C V_o^2 \qquad (2)$$

so that $$R = \sqrt{\frac{L}{C}} \frac{V_i}{V_o} \qquad (3)$$

where $V_o$ is the desired output voltage, $V_i$ is the input source voltage, L is the inductance of the inductor 18 and C is the capacitance of the capacitor 22. It should noted that adjustments might be necessary to equation (3) to compensate for losses and for the voltage drop in diode 24, for example.

Depending on the circuit design, for example, inordinately small R value or inordinately high power rating of the resistor 16, adjustments to equation might be necessary. For example, if a boost converter is designed to meet given specifications of input voltage, output voltage, output power, switching frequency, percent current ripple in inductor, and percent voltage ripple on capacitor $V_i$, $V_o$, P, J, δi, and δv, respectively, then it can be shown that $$R = \frac{V_i^2}{P} \sqrt{\frac{\delta v}{\delta i}} \qquad (4)$$

If the inductor has a DC resistance itself of $R_L$, then it is desirable that the voltage dropped on $R_L$ be a small fraction of the input voltage:

$$R_L V_i / P = I_i R_L = \gamma V_i \qquad (5)$$

where γ is a positive constant much less than 1. Taking the ratio of resistances, $$\frac{R}{R_L} = \sqrt{\frac{\delta v}{\delta i}} \frac{1}{\gamma} \qquad (6)$$

R is found to be generally greater (possible significantly) than $R_L$, since γ<<1, and the voltage ripple is typically no more than 10 times the current ripple. It should be noted, however, there maybe rare cases in which this is not true.

The power rating of the resistor depends on the current it carries, at most $V_i/R$. Making appropriate substitutions the following equation is obtained.

$$P_r = P \sqrt{\frac{\delta i}{\delta v}} \qquad (7)$$

Figure 4:
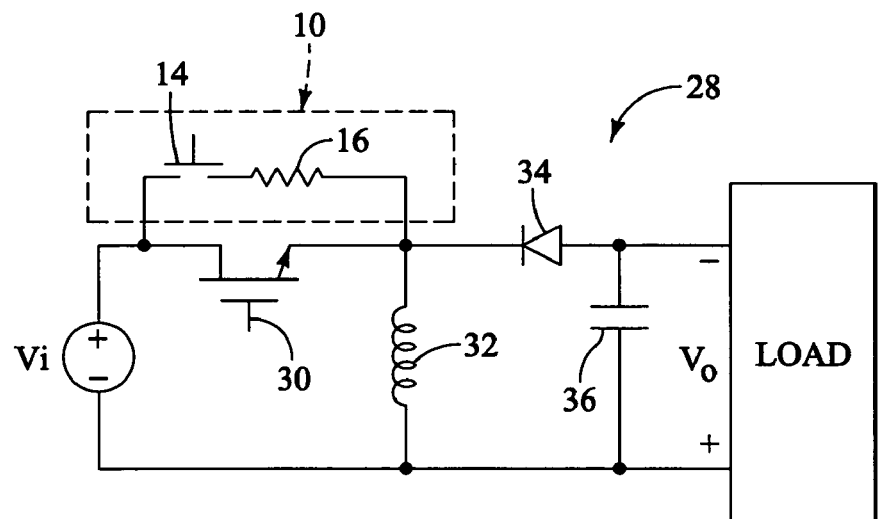
FIG. 4 is a circuit diagram of a buck-boost power converter including a startup circuit in accordance with an embodiment of the present invention.

The above described embodiments are applied to a boost power converter 12, but the invention is applicable to other power converter topologies as well. For example, FIG. 4 shows the startup circuit 10 being incorporated in a buck-boost converter 28 in another embodiment of the invention. Similar to the boost type power converter 12 shown in FIG. 3, the startup circuit 10 of the buck-boost converter 28 is connected in parallel with a semiconductor switch 30 (such as a diode, BJT transistor, MOSFET, etc.) and in series with an inductor 32.

The operation of the buck-boost converter 28 is also similar to that of the boost converter 12. In other words, the source voltage $V_i$ charges the inductor 32 with current as long as the switch 14 is closed. When the switch 14 is released a moment later, the inductor current continues to flow despite the switch being open. Therefore, the current is forced through a diode 34 and onto a capacitor 36. The stored energy of the inductor 32 is almost entirely (except for small losses) forced onto the capacitor 36, which charges to the output voltage $V_o$ and feeds the load.

The values of the resistor 16, the inductor 32, and the capacitor 36 determine the voltage of the capacitor, i.e., the output voltage $V_o$, as in the boost converter 12. Therefore, the resistor 16 of the startup circuit 10 becomes the design variable as in the boost converter 12, since the inductor 32 and the capacitor 36 values are selected without startup consideration to meet circuit objectives of the power converter 28. As such, the equation (3) derived above is also suitable for obtaining the approximate value of the resistor 16 in the buck-boost converter 28 as well.

Figure 5:
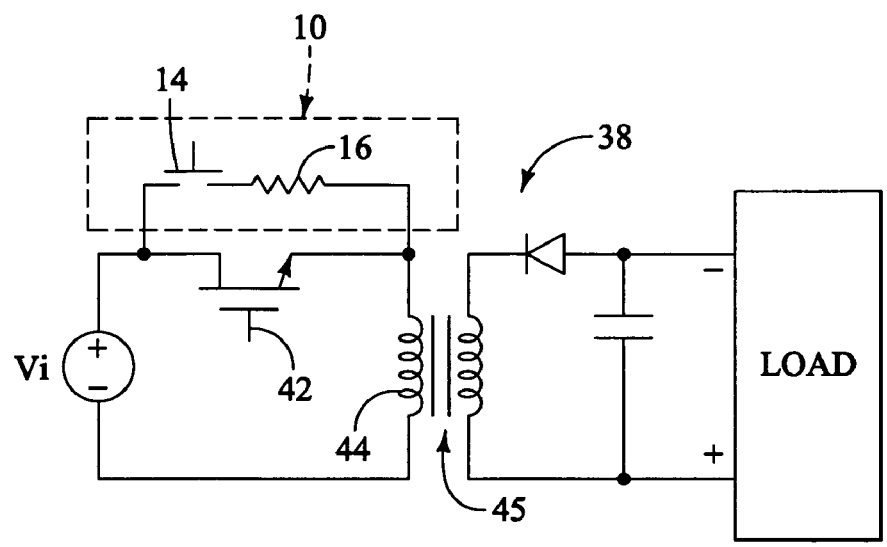
FIG. 5 is a circuit diagram of a flyback power converter including a startup circuit in accordance with an embodiment of the present invention.
Figure 6:
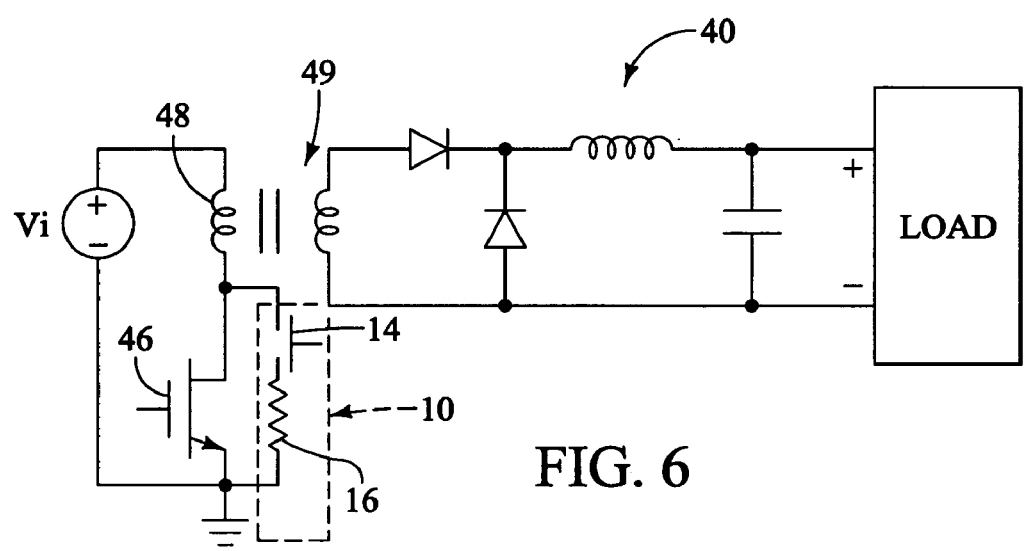
FIG. 6 is a circuit diagram of a forward power converter including a startup circuit in accordance with an embodiment of the present invention.

FIGS. 5 and 6 show the startup circuit 10 incorporated respectively in a flyback converter 38 and a forward converter 40. As in the boost converter 12 and the buck-boost converter 28, the startup circuit 10 in the flyback converter 38 is connected in parallel with a semiconductor switch 42 and in series with an inductor 44, which is the primary winding of a transformer 45. In the forward converter 40, the startup circuit 10 is connected in parallel with a semiconductor switch 46 and in series with an inductor 48, which is the primary winding of a transformer 49. Accordingly, the basic value of the resistor 16 of the startup circuits 10 for both the flyback converter 38 and the forward converter 40 can also be obtained using the equation (3) derived above. Those of ordinary skill in the art will recognize that equation (3), to be specifically suited for either the flyback converter 38 or the forward converter 40, may require scaling by a constant to obtain the desired approximate R value.

Figure 7:
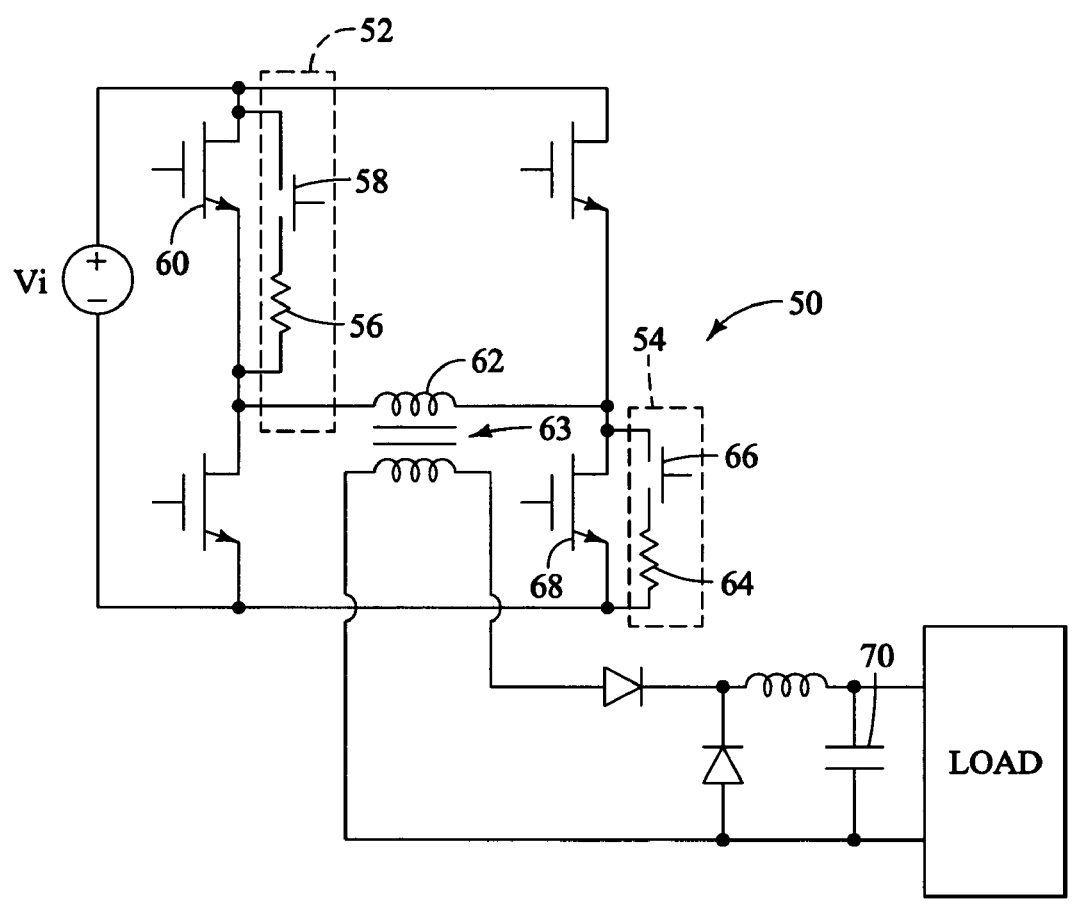
FIG. 7 is a circuit diagram of a full-bridge forward power converter including a startup circuit in accordance with an embodiment of the present invention.

Turning now to FIG. 7, a startup circuit in accordance with another embodiment of the invention is implemented as circuit 52 and circuit 54 in a full-bridge forward converter 50. The startup circuit 52 includes a resistor 56 and a switch 58 which are connected in parallel with a semiconductor switch 60 and in series with an inductor 62, which is the primary winding of a transformer 63. The startup circuit 54 includes a resistor 64 and a switch 66 which are connected in parallel with a semiconductor switch 68 and in series with the inductor 62. The resistors 56 and 64 are connected in series. Therefore, the total resistance R from the equation (3) above is approximately is R=R1+R2. Thus, either R1 or R2 may be set to arbitrary values to obtain the total approximate resistance R. The most appropriate values of resistance R1 and R2 are selected, for example, on the power ratings of the resistors 56, 64 that result from implementing the circuit and adjusting the resistances.

In one embodiment, the switches 58 and 66 in the startup circuits 52, 54 are included in a single two-pole switch with at least two "throws", for example, so that both switches 58 and 66 are closed and opened simultaneously. In this manner, the semiconductor switches 60 and 68 are cooperatively activated and deactivated with the simultaneous closing and opening of the switches 58 and 66 of the startup circuits 52, 54. As with the other power converter configurations described above, a capacitor 70 is charged to provide the output voltage $V_o$. The switch incorporating the switches 58, 66 in the startup circuits 52, 54 is a momentary mechanical switch. However, a non-momentary mechanical or electronic switches are also contemplated.

It should be understood that regardless of the type of power converter, the startup circuit in accordance with the embodiments of the invention appears in parallel with the activating or triggering semiconductor switch of the power converter and in series with the charging inductor. In this manner, the startup circuit enables the inductor to charge to a sufficient voltage onto the capacitor to start the regulator circuit.

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

The invention claimed is:

1. An apparatus for starting a power converter for converting an input voltage to an output voltage, the power converter having at least an energy storing device and a trigger switch for enabling the power converter to generate the output voltage, said apparatus comprising:
   a first switch; and
   a resistive element connected in series with said first switch;
   wherein said first switch and said resistive element are connected in parallel with the trigger switch, the first switch charges the energy storing device when the first switch is closed, and the energy storing device activates the trigger switch as the charge on the energy storing device is released.

2. The apparatus as defined in claim 1, wherein said first switch comprises a momentary switch.

3. The apparatus as defined in claim 1, wherein said resistive element comprises a resistor.

4. The apparatus as defined in claim 1, wherein said resistive element comprises a wire.

5. The apparatus as defined in claim 1, wherein the energy storing device discharges when the first switch is opened.

6. The apparatus as defined in claim 5, wherein said first switch and said resistive element are connected in series with the energy storing device.

7. A power converter for converting an input voltage to an output voltage, comprising:
   an energy storing device arranged to be electrically connected to an input voltage source;
   a first switch for activating the power converter to generate the output voltage;
   a second switch electrically connected to said input voltage source; and
   a first resistive element connected in series with said second switch;
   wherein said second switch and said first resistive element are connected in parallel with the first switch, said second switch charges the energy storing device with the input voltage source when said second switch is closed, and said energy storing device activates said first switch as the charge is released.

8. The power converter as defined in claim 7, wherein said energy storing device comprises an inductor.

9. The power converter as defined in claim 7, wherein said first switch comprises a semiconductor switch.

10. The power converter as defined in claim 7, wherein said second switch comprises a momentary switch.

11. The power converter as defined in claim 7, wherein said first resistive element comprises a resistor having a resistive value which enables said energy storing device to be charged at least to a voltage level necessary to activate said first switch.

12. The power converter as defined in claim 11, further including a capacitor electrically connected to said first switch for generating the output voltage, and wherein an approximate value of said resistor is determined from equation, $$R = \sqrt{\frac{L}{C}} \frac{V_i}{V_o}$$

where $V_o$ is the desired output voltage, $V_i$ is the input voltage, L is the inductance of the energy storing device and C is the capacitance of said capacitor.

13. The power converter as defined in claim 7, wherein said second switch and said first resistive element are connected in series with said energy storing device, and the charge on said energy storing device is released when said second switch is opened.

14. The power converter as defined in claim 7, wherein power converter converts a low input voltage to a higher output voltage.

15. The power converter as defined in claim 7, wherein said power converter comprises a boost converter.

16. The power converter as defined in claim 15, wherein said second switch and said first resistive element are connected in series with said energy storing device, and said second switch and said first resistive element are downstream of said energy storing device from the input voltage.

17. The power converter as defined in claim 7, wherein said power converter comprises a buck-boost converter.

18. The power converter as defined in claim 17, wherein said second switch and said first resistive element are connected in series with said energy storing device, and said energy storing device is downstream of said second switch and said first resistive element from the input voltage.

19. The power converter as defined in claim 7, wherein said power converter comprises a flyback converter.

20. The power converter as defined in claim 19, wherein said second switch and said first resistive element are connected in series with said energy storing device on a primary side of a power transformer of the flyback converter, and said energy storing device is downstream of said second switch and said first resistive element from the input voltage.

21. The power converter as defined in claim 7, wherein said power converter comprises a forward converter.

22. The power converter as defined in claim 21, wherein said second switch and said first resistive element are connected in series with said energy storing device on a primary side of a power transformer of the forward converter, and said second switch and said first resistive element are downstream of said energy storing device from the input voltage.

23. The power converter as defined in claim 7, further including,
    a third switch, cooperatively with said first switch, for activating the power converter to generate the output voltage, and
    a second resistive element electrically connected in series with a fourth switch,
    wherein said second resistive element and said fourth switch are connected in parallel to said third switch.

24. The power converter as defined in claim 23, wherein said third switch comprises a semiconductor switch and said second resistive element comprises a resistor.

25. The power converter as defined in claim 23, wherein said second switch and said fourth switch electrically connect and disconnect said first and second resistive elements simultaneously to the input voltage source.

26. The power converter as defined in claim 23, wherein said power converter comprises a full-bridge forward converter.

27. The power converter as defined in claim 26, wherein said energy storing device is connected in series with said second switch and said first resistive element downstream thereof, and connected in series with said fourth switch and said second resistive element upstream thereof.

28. A method for starting a power converter for converting an input voltage to an output voltage, the power converter having at least an energy storing device and a trigger switch for activating the power converter to generate the output voltage, said method comprising:
    connecting a startup circuit in parallel with the trigger switch and in electrical connection with the energy storing device;
    activating said start circuit to charge the energy storing device to a predetermined voltage; and
    deactivating said startup circuit to discharge the energy storing device;
    wherein the discharge of the energy storing device activates the trigger switch.

29. The method as defined in claim 28 wherein said startup circuit includes a resistor connected in series with a momentary switch.

30. The method as defined in claim 29 wherein said resistor is selected to be a value which enables the energy storing device to be charged at least to a voltage level necessary to activate the trigger switch.

31. The method as defined in claim 30 wherein an approximate value of said resistor is determined from equation, $$R = \sqrt{\frac{L}{C}} \frac{V_i}{V_o}$$

where $V_o$ is the desired output voltage, $V_i$ is the input voltage, L is the inductance of the energy storing device and C is the capacitance of a capacitor for generating the output voltage.

* * * * *

UNITED STATES PATENT AND TRADEMARK OFFICE
CERTIFICATE OF CORRECTION

PATENT NO. : 7,078,883 B2  Page 1 of 1
APPLICATION NO. : 10/819709
DATED : July 18, 2006
INVENTOR(S) : Chapman et al.

It is certified that error appears in the above-identified patent and that said Letters Patent is hereby corrected as shown below:

In the Issued Patent Please Insert Item [56]:

References Cited, Other Publications, line 1, after "J.M. Damaschke, "Design of a", please delete "low Input" and insert --Low Input-- therefor.

References Cited, Other Publications, line 11, after "/Publications/", please delete "PressKit/nsf/" and insert --PressKit.nsf-- therefor.

References Cited, Other Publications, line 19, after "K.N. Leung," please delete "P.K.T. Mok, A sub-1-V" and insert --P.K.T. Mok, "A sub-1-V-- therefor.

References Cited, Other Publications, line 21, after "voltage", please delete "device, IEEE" and insert -- device," IEEE-- therefor.

References Cited, Other Publications, line 23, after "W. Qi," please delete "S. Bingxian, A design" and insert --S. Bingxian, "A design-- therefor References Cited, Other Publications, line 24, before "*International Conference*", please delete "1 V operation, $4^{th}$"" and insert --1 V operation," $4^{th}$-- therefor Signed and Sealed this Fifth Day of December, 2006

JON W. DUDAS
*Director of the United States Patent and Trademark Office*